J. DALZIEL.
VARIABLE SPEED GENERATOR SYSTEM.
APPLICATION FILED APR. 6, 1907.
1,183,348.
Patented May 16, 1916.
2 SHEETS—SHEET 1.
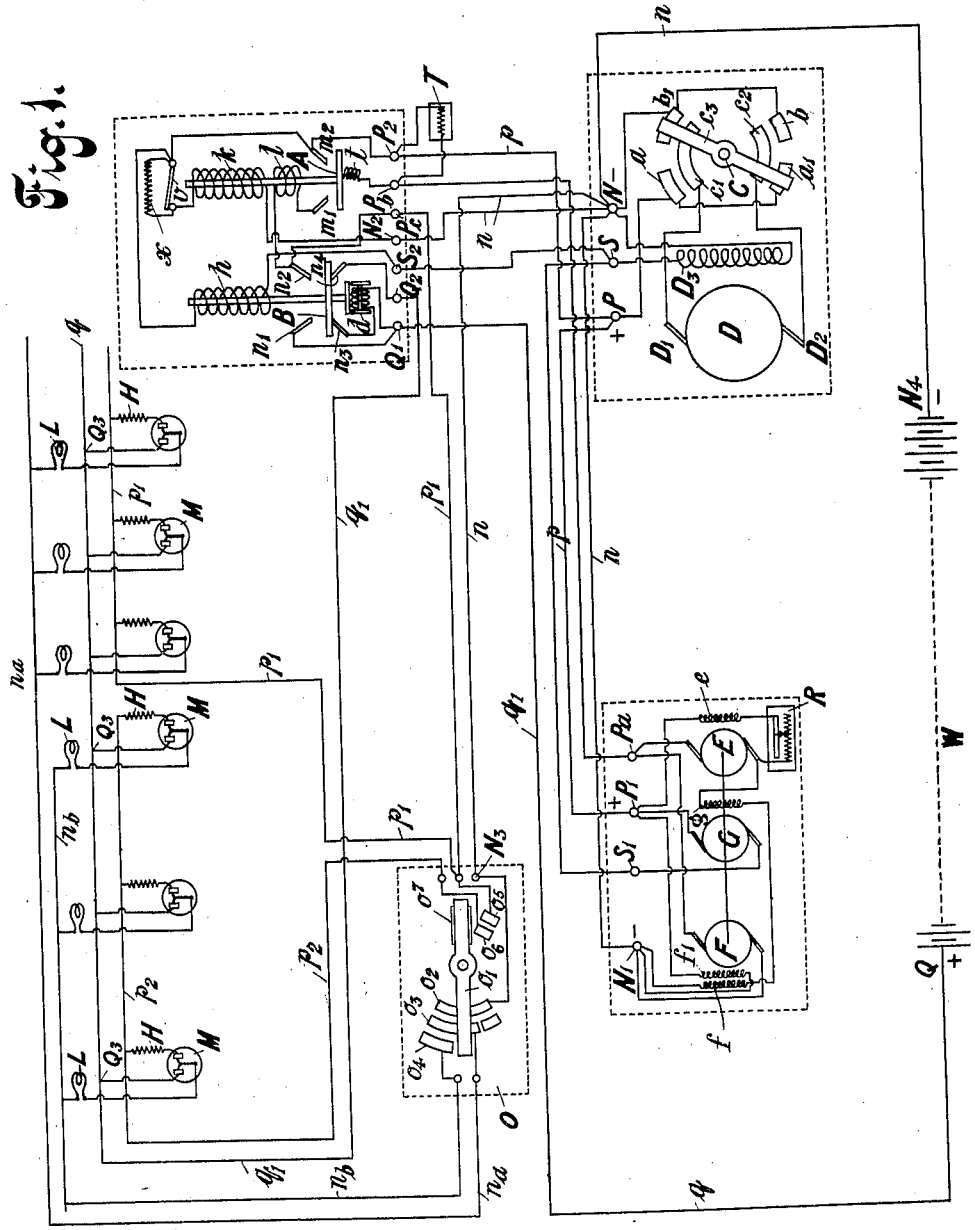

J. DALZIEL.
VARIABLE SPEED GENERATOR SYSTEM.
APPLICATION FILED APR. 6, 1907.
1,183,348.
Patented May 16, 1916.
2 SHEETS—SHEET 2.
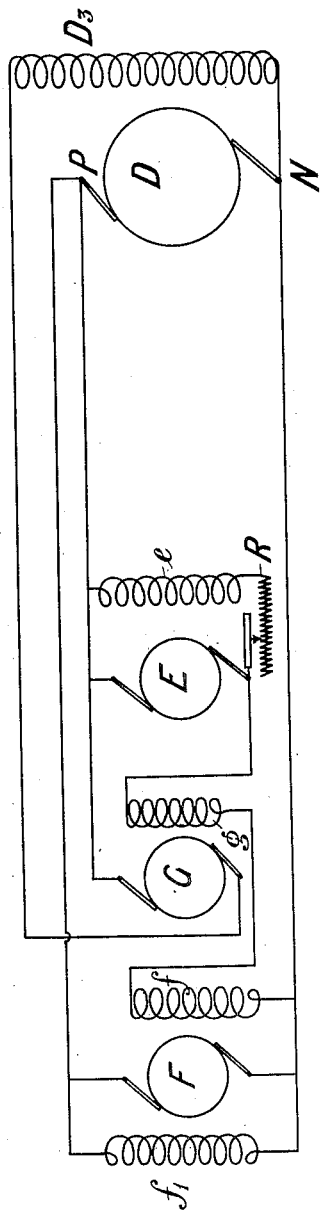

UNITED STATES PATENT OFFICE.

JAMES DALZIEL, OF DERBY, ENGLAND.

VARIABLE-SPEED-GENERATOR SYSTEM.

1,183,348.   Specification of Letters Patent.   Patented May 16, 1916.

Application filed April 6, 1907. Serial No. 366,743.

*To all whom it may concern:*

Be it known that I, JAMES DALZIEL, a subject of the King of Great Britain, and residing at Derby, in the county of Derby, England, have invented certain new and useful Improvements in Variable-Speed-Generator Systems, Especially Applicable to Railway-Carriages and the like, of which the following is a specification.

This invention relates to apparatus for supplying and controlling the voltage of electrical energy to railway carriages and the like cases where the generator has a variable speed, such for example as the system described in Letters Patent, 977,074, granted Nov. 29, 1910, made by me, and has reference more particularly to the modification last described in the said specification and the object is to improve such apparatus generally, and in particular so as to insure better regulation of the voltage especially when the generator is cut-in or cut-out, ease in starting up the auxiliary machines, and definite action of the cut-in and cut-out switch.

I will describe my invention as applied to railway carriage lighting, although it is to be understood that it is applicable to other analogous purposes where, as in this particular instance, a generator of variable speed is required to give an approximately constant voltage between certain limitations of speed, such for example as the case where a generator for electrical supply is driven by a wind-mill or other variable speed motor.

I have illustrated my invention in the accompanying drawings, in which—

Figure 1 shows the general arrangement and connections of the apparatus arranged for railway carriage lighting, and Fig. 2 the connections of the auxiliary machines.

In the drawings the arrangements and connections are shown diagrammatically; the constructional details of the several parts are largely omitted, since these features, in view of the description and drawings herein, would be clearly understood by those ordinarily skilled in such matters.

An apparatus for railway carriage lighting, according to my invention, comprises a generator D, driven from the carriage axle and provided with a reversing switch C to reverse the connections when the direction of rotation is reversed; a battery W adapted to supply the electrical energy when the generator is cut-out; automatic cut-in and cut-out switches A, B, adapted to cut the generator in when the speed is such as to give the desired minimum voltage; auxiliary machines E, F and G, adapted to control the voltage of the generator; suitable resistances H, adapted to be inserted in series with the lamps L, when the generator is cut-in; and the necessary circuit and main switches M and O, to control the lights or other current consuming devices.

The auxiliary machines to control the voltage consist of a motor, F, an exciter, E, and a controller, G, the armatures of which are mechanically connected together as described in the said prior specification; the arrangements of windings and connections are, however, in the present invention, modified as follows;—the exciting coils of the auxiliary machines are so connected that, as the speed of the generator rises, a counter-electromotive-force provided by the controller armature, which is in series with the main generator field winding across the line, also rises and thus reduces the current in the said field winding and controls the voltage of the main generator within the prescribed limits; in order to insure a very close regulation the controlling action of the controlling armature may be made more effective by so arranging the connections of the motor which drives the exciter and controller, that as the voltage of the generator rises, the speed of the motor, and therefore the speed and voltage of the exciter, is reduced, which action tends to still further increase the counter-electro-motive-force of the controller and to reduce the excitation of the main generator field. One arrangement by means of which this result may be accomplished is as follows;—the brush terminals $D_1$ and $D_2$ of the generator are connected to the segments $c_1$ and $c_2$ of the reversing switch, and the contact arm, $c_3$, of the switch is so moved in accordance with the direction of rotation of the generator (and therefore in accordance with the generator polarity) that it connects $c'$ with the contact $a$ and $c_2$ with the contact $b$, when $c_1$ is positive and $c_2$ negative; and connects $c_1$ with $b_1$ and $c_2$ with $a_1$, when $c_1$ is negative and $c_2$ positive; $a$ and $a_1$ are connected together and to the terminal P which therefore, independently of the direction of rotation of the generator, is always positive; $b$ and $b_1$ are connected together and to the terminal N, which also, independently of the direction of rotation of the generator, is always negative. The shunt winding $D_3$ of the main generator is connected at one end to the negative terminal N and at the other end to a separate terminal S.

The auxiliary machines are connected and arranged as follows:—The auxiliary terminals $P_1$, $N_1$, and $S_1$, are connected to P, N, and S, and it may be remarked here that throughout the drawings, $P_1$, $P_2$, etc., are respectively terminals connected to the main positive terminal; $N_1$, $N_2$, etc., are respectively terminals connected to the main negative terminal; $S_1$, $S_2$, etc., are respectively terminals connected to the positive end, S, of the shunt winding of the main generator D; the letters $p$, $n$, designate, respectively, positive and negative leads, and $q$ the positive lead from the battery.

The exciter E is connected across the line in series with a controller field winding $g$ and a motor field winding $f$; these, however, are not connected directly between $P_1$ and $N_1$; one end is connected to $N_1$ and the other end to $P_a$, which is in turn connected to $P_b$, a terminal on the switch A which, when the switch is closed, is connected to the terminal $P_2$. The exciter shunt winding $e$ is connected in series with a rheostat R by which the voltage is regulated. One terminal of the controller G is connected through $P_1$ to P, and the other end is connected through $S_1$ to S, the positive end of the main generator shunt winding. The motor F, is connected between $N_1$ and $P_a$; as stated, $P_a$ is connected to the terminal $P_b$ on the switch A, which when closed connects $P_b$ to $P_2$; when the switch is open, $P_b$ is connected to $P_2$ through the starting resistance T; the motor has a shunt winding $f_1$ connected across the line from $P_1$ to $N_1$ so that there is full shunt excitation at starting.

The arrangement and connection of the auxiliary machines to control the generator voltage just described is that best adapted for the particular case illustrated in Fig. 1, and I have shown, in Fig. 2, this part of the invention with the connections somewhat simplified. In Fig. 1 the controller and exciter are assumed to be driven by any suitable motor F. The exciter voltage is regulated by the rheostat R, and is usually fixed at or about the voltage which it is desired the generator should supply normally. In each case the windings are so arranged that as the voltage of the generator D tends to rise in accordance with the rise of speed, the counter-electro-motive-force provided by the armature of the controller G is effective in reducing the current in the main generator field winding $D_3$ and in this way controls the voltage of the main generator within the normal limits prescribed.

In the arrangement described in Fig. 1, the current in the controller field winding $g$ and in the auxiliary motor field winding $f$ in series therewith, is proportional to the difference between the exciter voltage and the line voltage; when these two are equal there will be no current in these windings, and no counter-electro-motive-force supplied by the controller; when the speed of the main generator rises, the current in the auxiliary motor winding and the controller field winding increases in virtue both of the increased line voltage and the reduced exciter voltage consequent upon the reduction of speed of the motor caused by the auxiliary winding strengthening the motor field. The exciter voltage is thus not a constant voltage in my arrangement, but falls as the speed of the generator increases. The relative number of turns in the fields $f$ and $f'$ of the motor is such that whatever tendency the motor may have to increase in speed, due to the increased voltage of the generator D, is counteracted by the auxiliary field $f$ producing an excitation which decreases the speed of the motor. Although the speed of the controller G is thus also reduced, nevertheless the net result is an increased counter electromotive force supplied by the armature of the controller G due to the increased excitation of the controller field $g$ resulting from the increased voltage of the main generator D and the reduced counter electromotive force supplied by the exciter E. Thus a decrease in the excitation of the main generator D is affected which maintains a substantially uniform voltage on the translating devices.

The cut-in and cut-out switch A B is constructed and connected to the various circuits as follows:—There are two switches operated electro-magnetically; these for convenience of description will be referred to as A and B. The switch A is open in its lower position and closed in its upper position; the switch B is a two way switch closing one circuit in its lower position and another circuit in its upper position, and each switch occupies its lower position when its solenoid is deënergized.

Referring in more detail to the switches A and B, the main solenoid $k$ of the switch A is connected, across from $N_2$ to $P_2$, that is across the terminals of the generator; to prevent undue heating of this solenoid a resistance $x$ and switch $v$ are provided so that when the switch A closes the contacts $m_1$ and $m_2$ its plunger opens the switch $v$ and puts the resistance $x$ in series with $k$; this reduces the current in $k$ to a value just sufficient, in addition to the series turns in $l$, to maintain the switch in its closed position, which current is, of course, much less than that necessary to operate it with certainty. The contact $m_1$ is connected through the solenoid $l$ to the contact $n_2$ of the switch B and to the terminal $P_c$; when the switch A is closed, $P_c$ and $n_2$ are connected through $m_2$ and $P_2$ to P, the positive terminal of the generator. The terminal $P_b$ is connected to the switch A by the flexible conductor $t$, so that when A is in its upper position the starting resistance T is cut out.

The solenoid $h$ of the switch B is connected across the terminals $S_2$ and $P_2$, that is across the controller G. The switch H in its lower position joins the lower contacts $n_3$ and $n_4$, this connects the terminal $Q_1$ through the winding of the magnet $d$ to $Q_2$ which is connected to $q_1$ the battery positive to the lights; the magnet $d$ tends to hold the switch in its lower position. In its upper position the switch B joins the upper contacts $n_1$ and $n_2$, thus connecting the positive terminal of the battery, through the solenoid $l$ and terminal $P_2$, to the positive terminal P of the generator.

The main lights switch O is constructed as follows:—The contact lever $o_1$ is adapted at one end to make continuous contact with the segment $o_2$ and to make contact with $o_3$ or with both $o_3$ and $o_4$ according to its position; $o_2$ is connected to $N_3$; $o_3$ is connected to $n_a$ the common battery and generator negative for, say, one half of the lamps; and $o_4$ is connected to $n_b$ the common battery and generator negative for the rest of the lamps.

When the switch A is closed, the terminal $P_c$ becomes connected to the positive generator terminal and the lead $p_1$ becomes a positive lead and is connected through the several resistances H to one half of the lamps L; the lead $p_1$ is connected also to the contact $o_5$ of the switch O, and a second contact $o_6$ on this switch is connected to a lead $p_2$ which is connected through the several resistances H to the rest of the lamps. An insulated contact maker $o_7$ is carried on the lever $o_1$ and in one extreme position of the lever the contacts $o_5$ and $o_6$ are connected together by $o_7$ so that $p_1$ and $p_2$ are connected and form one generator positive lead.

The switch O when the longer arm of the lever $o_1$ is depressed disconnects $N_3$ from both $n_a$ and $n_b$; when this arm is in mid-position $N_3$ is connected to $n_a$, and when this arm is in its upper position, $N_3$ is connected to both $n_a$ and $n_b$ and at the same time $p_1$ is also connected to $p_2$ through $o_5$ and $o_6$.

In addition to the main switch O each lamp may have its own switch M, and this switch is so arranged that it connects the lamp across between the common battery and generator lead, $n_a$ or $n_b$, as the case may be, and both the battery lead $q$ and the generator positive lead $p_1$ or $p_2$, as the case may be.

In the particular embodiment of my invention shown in the drawings, the resistances for absorbing the excess of voltage when the lamps are on the generator are arranged individually, but it is to be understood that these resistances may be arranged in any other manner well known in the art.

When the main generator is at rest or rotating below the minimum speed at which it is to be cut in, the lamps are connected across the battery, the connections being made through Q the battery positive terminal, $Q_1$, the magnet $d$, contacts $n_3$, $n_4$, terminal $Q_2$, lead $q_1$, switches M, lamps L, leads $n_a$ or $n_b$, $N_3$, N, and battery negative terminal $N_4$; under these conditions the auxiliary machines are connected to the generator terminals P, N and S, as described.

When the speed of the generator reaches the minimum prescribed, the shunt coil $k$ of the switch A is sufficiently energized to close the switch and the generator is connected to the lamps in series with the resistance, the connections being as follows:—Generator positive terminal P, terminal $P_2$, contacts $m_2$, $m_1$, coil $l$, terminal $P_c$, lead $p_1$ or $p_2$, resistance H, switch M, lamps L, leads $n_a$ or $n_b$, switch O, terminal $N_3$, and generator negative terminal N. Both battery and generator are now connected to the lamps, the excess generator voltage being absorbed by the resistances. As the voltage of the generator rises, the generator gradually picks up the lamp load, the battery current to the lamps gradually diminishing. The voltage of the controller rises sufficiently to energize the solenoid $h$ of the switch B and tends to raise the switch to its top position; this is, however, prevented by the battery current in $d$, so that until the battery current falls below a predetermined limit the switch is not lifted. This mode of controlling the switch B insures that the switch shall not rise and transfer the battery from the lamps to the generator until the voltage of the latter has reached a suitable value, and by thus making the transfer at a time when the conditions are stable, prevent any flicker or any pumping action of the switches.

The series winding $l$, once the generator current is established, serves as explained to maintain the switch A in its closed position. The battery is, of course, charged by the generator while the latter is feeding the lights. When the generator voltage falls, the switches A and B fall to their lower position and the battery is again put on to the lights.

We find that the magnet $d$ of the switch B is of considerable advantage in the case of a battery which has run down; in such a case the back electro-motive-force of the battery is usually so low that the battery takes a charging current from the generator positive through the leads $p_1$ and $p_2$ across the resistances H to the battery positive lead $q$ through the battery to the generator negative N; this current is usually sufficient to cause the magnet $d$ to hold the switch B down till the battery becomes partly charged, and thus avoids the sudden rush of current which will take place if the over-discharged battery were connected directly in the first instance across the generator terminals.

It is to be understood that while I have, in order to describe and illustrate a complete working arrangement of my invention, referred to special arrangements and connections which I have found to give good results in practice, I do not restrict myself to the particular arrangement described by way of example; for the nature of my invention is such that considerable modifications may be made while still embodying the main features of my invention as claimed herein.

Having now fully described my invention, I declare that what I claim, and desire to secure by Letters Patent is:—

1. In a system for controlling the voltage of variable speed generators, the combination of the variable speed generator, and exciter generator, a controller generator and a motor with connections for varying the field strength of both the controlling generator and the motor in accordance with the difference of voltage between the main generator and the exciter.

2. In apparatus for controlling the voltage of variable speed generators, in combination with the generator, an exciter and a variable speed controller generator, the armatures of which are mechanically connected together and suitably driven, the exciter being connected in series with the controller field winding across the generator terminals, and the controller being connected in series with the generator field winding across the generator terminals; substantially as described.

3. In apparatus for controlling the voltage of variable speed generators, in combination with the generator, an exciter having appropriate field magnet windings, a controller and a motor the armatures of which are mechanically connected together; the exciter being connected in series with the controller field winding and a motor field winding, across the generator terminals, and the controller being connected in series with the generator field winding across the generator terminals; substantially as described.

4. In a system for controlling the voltage of variable speed generators, the combination of a variable speed generator, a controller counter electro-motive-force generator connected to the field circuit of the variable speed generator, and an exciter generator controlling the excitation of the field winding of the controller generator, the controller generator acting differentially.

5. In apparatus such as herein described, in combination with the variable speed generator, a controller generator governing the main generator, and a switch which in the first position completes the battery circuit through the lamps, and which in the second position connects the battery to the generator, and automatic means responsive to the E. M. F. of the controller generator for bringing the switch into its second position, substantially as described.

6. In a train lighting system, the combination with a variable speed generator, voltage regulating means connected in the field circuit of said generator, a battery, resistance and translating devices, and switching means responsive to the battery current for connecting the translating devices directly across the battery, and for connecting the lamps to the generator through a resistance and means to prevent the operation of said switching means until the condition of the system is stable.

7. The combination with a variable speed generator, of a variable speed controlling counter electro-motive-force generator whose field strength is governed by the potential of the main generator and a winding on the field of the main generator being connected in series with the armature of said controlling generator and an exciting generator connected in the field circuit of said variable speed controller generator.

8. In combination with a variable speed dynamo electric generator; means for regulating the potential of the generator; a battery; and translating devices; a generator switch adapted when closed to connect the generator to the translating devices; electromagnetic means adapted to close the generator switch when the generator voltage exceeds a given limit, a two-way battery switch adapted in one position to connect the battery to the translating devices, and in the other position to connect the battery to the generator, electro-magnetic means tending to operate the battery switch to the latter position, and electro-magnetic means responsive to the battery current tending to hold the switch in the former position; substantially as set forth.

In testimony whereof I have hereunto set my hand in the presence of two subscribing witnesses.

JAMES DALZIEL.

Witnesses:
J. E. LLOYD BARNES,
JOSEPH E. HIRST.